US005623188A

United States Patent [19]
Bildgen

[11] Patent Number: 5,623,188
[45] Date of Patent: Apr. 22, 1997

[54] METHOD AND APPARATUS FOR CONTROLLING AN OSCILLATING CIRCUIT OF A LOW PRESSURE FLUORESCENT LAMP

[75] Inventor: Marco Bildgen, Aix-en-Provence, France

[73] Assignee: SGS-Thomson Microelectronics S.A., Saint Genis Pouilly, France

[21] Appl. No.: 490,462

[22] Filed: Jun. 14, 1995

[30] Foreign Application Priority Data

Jun. 15, 1994 [FR] France ................... 94 07330

[51] Int. Cl.$^6$ .................................................. H05B 37/02
[52] U.S. Cl. ..................... 315/307; 315/224; 315/DIG. 7
[58] Field of Search .............................. 315/307, 209 R, 315/308, DIG. 5, DIG. 7, 224

[56] References Cited

U.S. PATENT DOCUMENTS 4,868,725  9/1989  Nuns ............................. 363/17
5,212,428  5/1993  Sasaki et al. ................. 315/308
5,233,273  8/1993  Waki et al. ................... 315/224
5,444,336  8/1995  Ozawa et al. ................ 315/307
5,485,059  1/1996  Yamashita et al. ........... 315/307

FOREIGN PATENT DOCUMENTS

0059064  9/1982  European Pat. Off. ........ H05B 41/39

Primary Examiner—Robert Pascal
Assistant Examiner—David Vu
Attorney, Agent, or Firm—David M. Driscoll; James H. Morris

[57] ABSTRACT

A control device for a low-pressure fluorescent lamp placed in an oscillating circuit comprises a circuit for the detection of the frequency of the current in the lamp to deliver an information element at output as a function of the lit or unlit state of the lamp. This information element may be used to activate a first circuit to detect the end of an alternation in the lamp or a second circuit to detect the end of an alternation in the lamp, making it possible to let the lamp work at the resonance frequency of the oscillating circuit or at a frequency higher than the resonance frequency.

29 Claims, 4 Drawing Sheets

FIG_1

FIG_2

FIG_5

FIG_6

5,623,188

METHOD AND APPARATUS FOR CONTROLLING AN OSCILLATING CIRCUIT OF A LOW PRESSURE FLUORESCENT LAMP

BACKGROUND OF THE INVENTION

1. Field of the Invention

The invention relates to a control device for a low-pressure fluorescent lamp.

2. Discussion of the Related Art

The electrical behavior of these fluorescent lamps which contain low-pressure gases (neon, argon) is similar to that of a zener (avalanche) diode with a resistance in the gas that may become very low and negative after breakdown. Ions moving at high speeds lead the atoms of the gas to assume excited states in which they give out luminous lines.

The system used to control the lamps typically comprises a control device with a current source and an oscillating circuit in which the lamp is placed. This oscillating circuit typically has an inductor and a very large capacitor series-connected with the lamp and a very small capacitor parallel-connected with the lamp. This system enables current discharges to be made to go into the lamp between these two electrodes, in one direction and then in another, thus preventing the migration of ions. The current in each of the directions corresponds to one alternation of the oscillating circuit, such that each alternation corresponds to one half cycle of the oscillation of the current supplied to the oscillating circuit and is therefore approximately equal to one half of the period of oscillation.

According to the prior art, the control device with a current source typically has two electronic switches using power transistors supplied with a high DC voltage and a current transformer. The current transformer is preferably a saturation transformer that limits the current in the lamp by the saturation of its magnetic core and leads to the switch-over of the switches.

The electronic switches generally use bipolar technology power transistors for the switching and parallel and reverse-connected diodes to let through the current during the alternations and various protection elements such as diodes and capacitors.

These transformer devices are very bulky and costly because they require many components and allow only a very low degree of integration. Furthermore, the storage time of the bipolar transistors is a highly variable characteristic, for example ranging from 2 to 7 microseconds. This variation is not negligible as compared with the time at the end of which the transformer gets saturated for a current alternation. It is about three microseconds for an alternation time of about ten microseconds. Hence, the time at the end of which the bipolar transistor goes off after saturation of the transformer in an alternation varies from 5 to 10 microseconds. This is very troublesome. In practice, the storage time of each transistor is measured after manufacture to classify it in a group corresponding to a narrow range of values, in order to use it in a control device adapted by means of resistors to this range of values. All this entails heavy penalties and is very costly.

To light up the lamp, the characteristics of the oscillator circuit with a parallel-connected inductor and capacitor are used. When this oscillating circuit works at its resonance frequency, its characteristic impedance becomes very small. The current in the oscillating circuit therefore becomes very great and the voltage in the parallel-connected capacitor also becomes very great. This is the principle used to break down the gas in a low-pressure fluorescent lamp. It has been seen that the oscillating circuit has a very small parallel-connected capacitor and a very large series-connected capacitor. When the lamp is not lit, at the start of the operation for turning it on, it is equivalent to an open circuit. If the inductor is referenced L, the series-connected capacitor is referenced Cs and the parallel-connected capacitor is referenced capacitor Cp. The resonance frequency f0 at the starting up of the system formed by the oscillating circuit and the lamp is given by $f0 = 1/2\pi (L.Cp.Cs/(Cp+Cs))^{1/2}$. Since $Cp \ll Cs$, we have f0 approximately equal to $1/2\pi (L.Cp)^{1/2}$.

If the operation is done at this resonance frequency f0, it has been seen that the current becomes very high in the oscillating circuit and an overvoltage then appears at the parallel capacitor Cp and therefore between the two electrodes of the lamp: at each alternation, the voltage rises to reach a voltage that is high enough (about 1,200 volts) to cause the breakdown of the gas. The lamp, as we have seen, is then equivalent to a very low value resistor that lets through all the current: the parallel-connected capacitor Cp is then virtually short-circuited and the new resonance frequency f1 of the system formed by the oscillating circuit and the lamp is then given by $f1 = +e, fra /2 + ee \pi (L.Cs)^{1/2}$, f1 being far lower than the first resonance frequency f0 (for $Cp \ll Cs$).

However, much as it is worthwhile making the oscillating circuit work at its resonance frequency f0 when starting up the system in order to achieve gas breakdown and therefore to light up the lamp, it is also equally dangerous to then continue to work at the resonance frequency f1 which is far lower.

Indeed, for this new resonant system, without the parallel-connected capacitor, the characteristic impedance is also far lower because of the large series-connected capacitor Cs. The current then becomes far greater with the risk of disrupting the system.

SUMMARY OF THE INVENTION

According to one illustrative embodiment of the invention, the frequency of the current in the lamp is detected in order to find out if the lamp is unlit or lit.

Depending on the state of the lamp, it is thus possible to regulate the current by enabling the system formed by the oscillating circuit and the lamp to work at its resonance frequency or by forcing it to work at a frequency that is slightly higher than the resonance frequency.

One embodiment of the invention relates to a control device tbr a low-pressure fluorescent lamp placed in an oscillating circuit. According to this embodiment, the device comprises a circuit for the detection of the frequency of the current in the lamp to deliver an information element at an output as a function of the state (unlit or lit) of the lamp.

According to yet another embodiment of the invention, the frequency detection circuit is a circuit to detect a relative drop in frequency.

In yet another embodiment of the invention a control device is provided for a lamp, the control device comprising a power transistor with a parallel and reverse-connected diode at its terminals and a switching control circuit placed in parallel on the transistor and the diode and delivering a binary control signal for the gate of the power transistor, the control device preferably comprising: (1) a voltage lamp generation circuit, reset at zero by a binary transition edge of the binary control signal of the gate of the power transistor; (2) a sample-and-hold circuit connected at input to the output of the voltage ramp generation circuit in order to hold, at its output, the ramp voltage level at the time of a first transition of the binary control signal of the gate of the power transistor; (3) a voltage divider circuit at output of the voltage ramp generation circuit; (4) a voltage comparator receiving, at input, the output of the sample-and-hold circuit and an output of the resistive divider: and (5) a circuit to memorize the high level of the output of the voltage comparator, delivering a binary signal indicating the lit or unlit state of the lamp.

According to another embodiment of the invention, the control device comprises a circuit to lock the frequency of the current into the resonance frequency of the unit formed by the oscillating circuit and the lamp, and a circuit to lock the frequency of the current into a frequency greater than the resonance frequency of the unit formed by the oscillating circuit lamp.

BRIEF DESCRIPTION OF THE DRAWINGS

Other characteristics and advantages of the invention are described in detail in the following description, given by way of a non-restricted indication of the invention and made with reference to the appended drawings, of which.

DETAILED DESCRIPTION

The invention relates to control devices without transformers which therefore use a transistor-based switching control circuit used in switching. In one example shown in FIG. 1, the control device thus has two identical circuits $Com_a$ and $Com_b$ series-connected between a DC high voltage and the ground, a circuit, for example $Com_a$, comprising a transistor $T_a$ with a reverse and parallel-connected diode $D_a$ forming the switch, and a circuit to control the gate of the transistor $CC_a$. The diode is preferably a parasitic diode of the power transistor.

Figure 1:
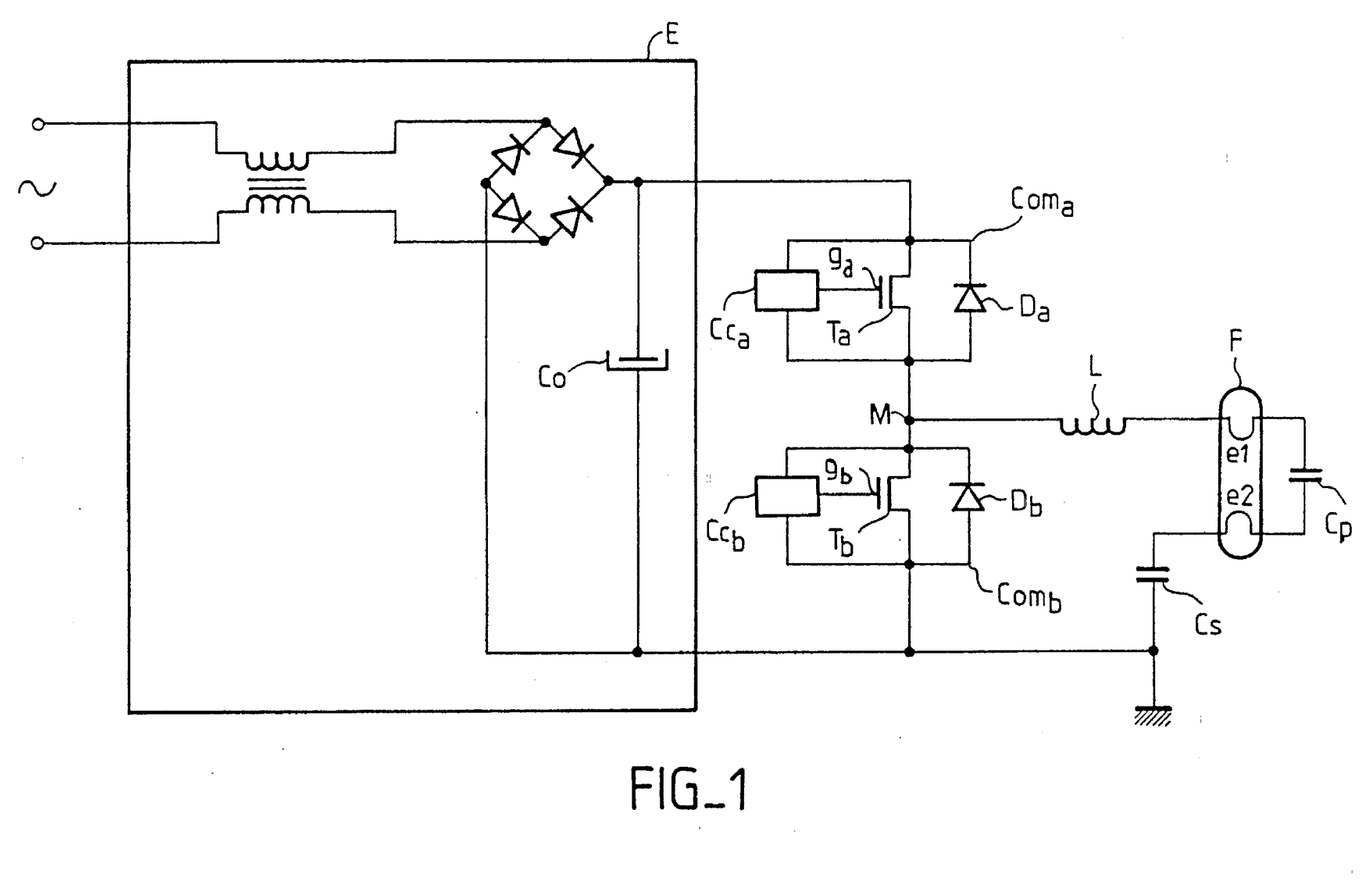
FIG. 1 shows a general diagram of a low-pressure fluorescent lamp device.

The principle of operation is as follows: at the outset, one circuit is open and the other is closed.

The one that is closed lets through the current from the lamp, and controls this current. Upon the detection of an event related to the current, it goes into the open state: this is the end of the alternation. The remainder of the current goes into the other circuit, which is still open, through the reverse-connected diode: this event is detected by this circuit which then gets closed (the gate is controlled to place the transistor in the "on" state). At the same time, the oscillator circuit gets demagnetized. When it is demagnetized, the current flows in the other direction.

The general diagram shown in FIG. 1 shows a lamp control system without a current transformer. Although the present invention is described herein as being used in such a system, the invention is not so limited and can also be used to control current in other types of systems.

The system of FIG. 1 comprises mainly two circuits $Com_a$ and $Com_b$, series-connected between a high voltage and the ground. In the example, the high voltage is given by a supply stage E with rectifier and filtering capacitor C0 that maintain a high DC supply voltage of about 300 V.

The circuits $Com_a$ and $Com_b$ shall be described in detail hereinafter with reference to FIG. 2.

The circuit $Com_a$ ($Com_b$) comprises chiefly a power transistor $T_a$ ($T_b$) with a parallel and reverse-connected diode $D_a$ ($D_b$) and a switching control circuit $CC_a$ ($CC_b$) parallel-connected with this transistor. The switching control circuit controls the gate $g_a$ ($g_b$) of the associated power transistor to place it in the ON state (switch closed) or OFF state (switch open).

The midpoint M between the two circuits $Com_a$ and $Com_b$ is connected to a terminal of an inductor L connected at the other terminal to a first electrode e1 of a low-pressure fluorescent lamp F. The other electrode e2 of the lamp is connected to a high-capacitance series capacitor Cs, connected to the ground. A parallel capacitor Cp is parallel-connected to the lamp. The inductor L, the series capacitor Cs and the parallel capacitor Cp form the oscillator circuit which is the current source for the lamp.

The general principle of operation is that, for an alternation, only one transistor is on: for example, the transistor $T_a$ is on and the transistor $T_b$ is off. At the end of an alternation, during the transient period when the transistor $T_a$ goes to the off state and when the transistor $T_b$ is still off, the current relating to the end of the alternation is seen as a negative current by the circuit $Com_b$ and goes into the reverse and parallel-connected diode $D_b$ on the transistor $T_b$. The oscillating circuit gets demagnetized and, at the same time, the current gradually rises to zero to become positive (seen from the circuit $Com_b$): the transistor $T_b$ then comes on.

Figure 2:
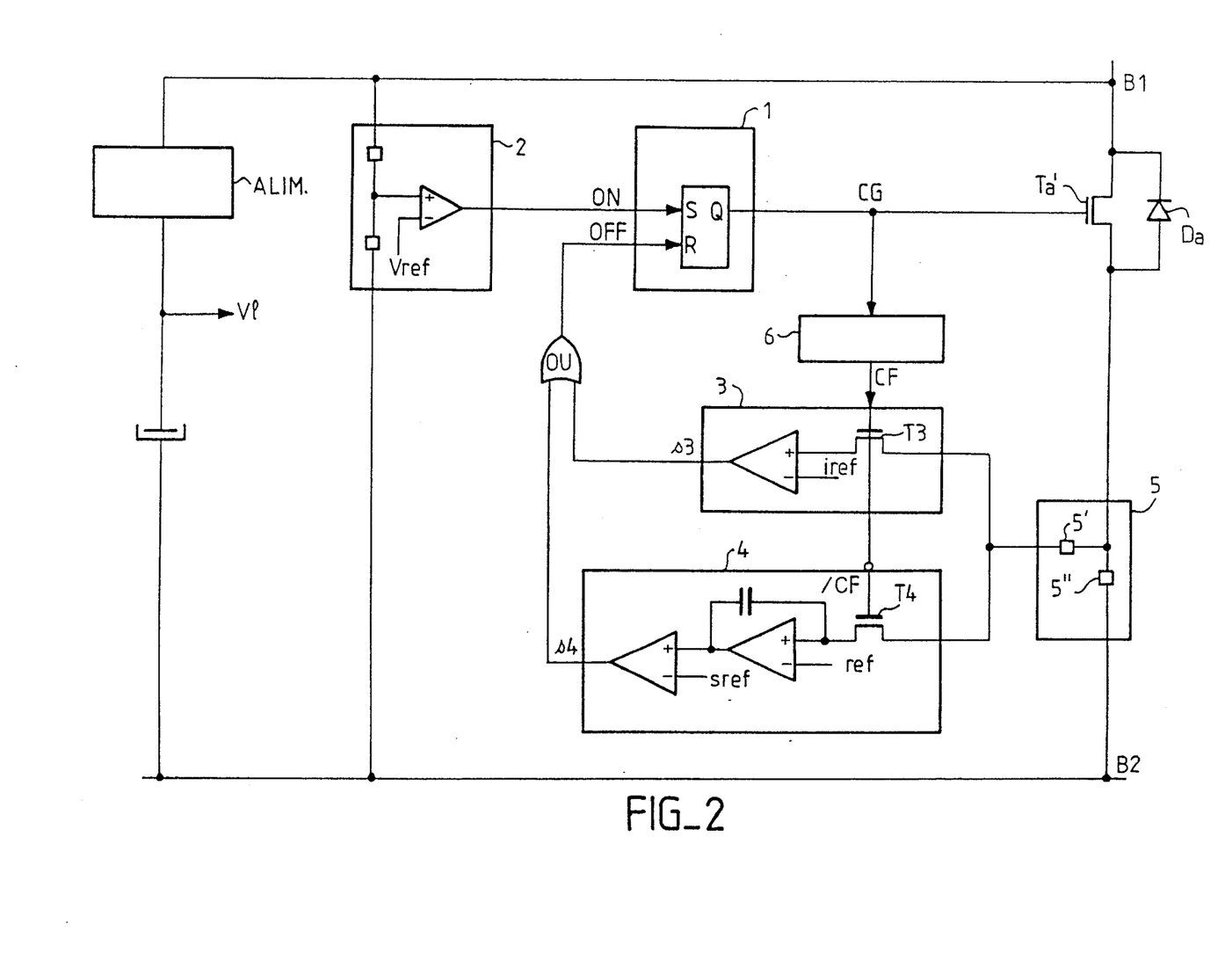
FIG. 2 is a block diagram of a control circuit of a power-transistor-based switch comprising a frequency detection circuit according to one embodiment of the invention.

FIG. 2 shows an exemplary embodiment of the circuit $Com_a$ with the switching control circuit $CC_a$ of the power transistor $T_a$ corresponding to the operation in switching control mode that has just been described and comprising a frequency detection circuit according to the invention.

The power transistor $T_a$ is connected between two terminals B1 and B2. The diode $D_a$ is reverse and parallel-connected between these terminals. In practice, it is a parasitic diode intrinsic to the transistor.

The switching control circuit is connected between these terminals B1 and B2 and, at output, delivers a binary signal CG for the control of the gate $g_a$ of the transistor $T_a$.

It comprises a circuit to generate a logic supply voltage V1 (Alim) from the high voltage, needed for the logic circuits of the switching control circuit. There is provision for a decoupling capacitance between the logic supply voltage output and the terminal B2 so as to maintain the logic supply level when the switch is closed (transistor on, bringing an almost null voltage between the terminals B1 and B2).

The signal CG for the control of the gate of the power transistor is controlled by a control circuit 1 as a function of the signals that it receives at input.

A first input signal, referenced ON in FIG. 2, is delivered by a circuit 2 for detecting the start of an alternation. In the example, the detection is based on the voltage at the terminals B1 and B2 of the transistor and the diode. This circuit for detecting the start of an alternation detects the transient phase relating to the change of an alternation when the other switch has been put in the off state, this being the transient phase during which the reverse-connected diode $D_a$ conducts current, thus dictating a very low voltage close to zero (equal to the threshold voltage of a diode) between the terminals B1 and B2. Such a circuit will typically comprise a resistive divider whose midpoint is connected to the input of a voltage comparator receiving a reference voltage Vref. The signal ON generated at output therefore corresponds to the detection of a new alternation for which it is necessary to control the on state of the transistor $T_a'$ namely to impose a positive logic voltage at its gate.

A second input signal, referenced OFF in FIG. 2, is delivered according to the invention by a first circuit 3 for detecting the end of the alternation or by a second circuit 4 for detecting the end of an alternation. In the example, the detection is based on the current flowing through the transistor and these two circuits for detecting the end of an alternation are connected to the input of a circuit 5 for rerouting the current flowing in the transistor. This circuit 5 may quite simply include a first current bypass load 5' connected between an electrode of the transistor and the input of the circuits 3 and 4 for detecting for the end of an alternation and a second resistive load 5' connected between this electrode and the terminal B2.

In the example where the control circuit 1 comprises an RS type bistable flip-flop circuit with a one-setting input S and a zero-setting input R, the signal ON is connected to the one-setting input S and the signal OFF is connected to the zero-setting input. When the signal CG for controlling the gate at output is at 1 (high logic voltage V1), the power transistor is on, corresponding to a short circuit, and lets through all the current of the lamp. When a signal CG for controlling the gate at output is at zero (null logic voltage), the power transistor is off, corresponding to an open circuit that lets through no current.

According to one embodiment of the invention, the switching control circuit preferably has two circuits for detecting the end of an alternation. In this embodiment, the detection is based on the current.

The first circuit 3 for detecting the end of an alternation comprises a transistor T3 to let through or not let through the current coming from the current bypass circuit 5. This transistor is followed in series by a comparator that receives a reference current iref. The output of the comparator delivers a current detection signal s3. In practice, the reference current has a value of some microamperes (1 $\mu A=10^{-6}$ A), that corresponds to a detection of an end of an alternation of the current in the operating circuit, if the oscillating circuit is allowed to work at its resonance frequency.

The second circuit for detecting the end of an alternation according to the invention is such that it obliges the oscillating circuit to work at a frequency greater than its resonance frequency. In this embodiment, the second circuit detects the power in the lamp and lets through only the current needed to develop the nominal power of the lamp.

In this embodiment, a transistor T4 is provided to let through or not let through the current coming from the bypass circuit 5, series-connected with an integrator followed by a comparator at a reference value sref. This reference value represents the mean current corresponding to the nominal power desired, given the ratio between the current rerouted by the circuit 5 and the current in the lamp.

The integrator is formed quite simply by a first-order low-pass filter or, as shown, by an operational amplifier receiving, at its positive input, the output of the current bypass circuit 5 or, at its negative input, a reference value that depends conventionally on the voltage excursion used at output of the circuit 5 as is well known to those skilled in the art. A capacitor is planned, connected between the positive input and the output of the amplifier. The integral of the current is applied to the input of the comparator which makes the comparison with a reference value sref corresponding to the nominal power of the lamp. The output of the comparator delivers a signal s4 for the detection of current. In practice, the end of the alternation is enforced for a current in the lamp that is still greater than the few amperes of the current iref of the first detection circuit, thus making it possible to impose a frequency greater than the resonance frequency on the oscillating circuit.

Thus, according to this embodiment of the invention, the control device for the low-pressure fluorescent lamp includes a circuit 3 to lock the device into the resonance frequency of the unit formed by the oscillating circuit and the lamp and a circuit 4 to lock it into a slightly higher frequency.

According to another embodiment of the invention, a frequency detection circuit 6 is provided; making it possible notably to activate either the circuit 3 or else the circuit 4 for detecting the end of an alternation in delivering an information element on the working frequency of the oscillating circuit on the basis of the binary signal CG tbr controlling the gate of the power transistor $T_a$.

Figure 3:
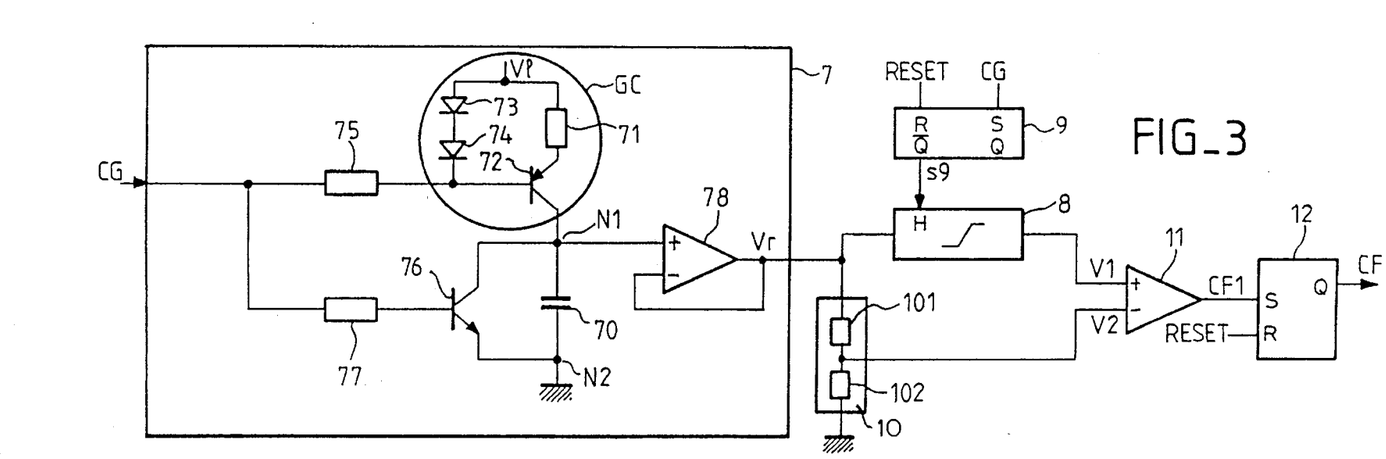
FIG. 3 is a first detailed diagram of a frequency detection circuit according to one embodiment of the invention.

This embodiment of the invention is shown in FIG. 3.

First of all, the frequency detection circuit comprises a circuit 7 for generating a voltage ramp Vr reset by the signal CG for controlling the gate of the power transistor $T_a$.

In this embodiment that is shown, the generation circuit 7 has a capacitor 70 having a first terminal N1 connected to the output of a current generator GC and a second terminal N2 connected to the ground.

The current generator comprises a resistor 71 series-connected with a transistor 72 and placed between the logic voltage V1 and the terminal N1 of the capacitor. In the example, it is a PNP type bipolar transistor. It also has two diodes 73, 74 series-connected directly between the logic voltage V1 and the base of the bipolar transistor (or the gate, for a P type MOSFET transistor).

A resistor 75 has a terminal connected to the gate of the bipolar transistor and receives, at another terminal, the signal CG for controlling the gate of the power transistor. This resistor 75 and the current generator GC form a charging circuit tbr the capacitor 70.

A discharge circuit is parallel-connected to the capacitor 70. This discharge circuit comprises a transistor 76 of a type opposite the type of the transistor (72) of the current generator. In the example, it is an NPN type bipolar transistor. The base of this transistor 76 is connected to a terminal of a resistor 77 which receives the gate control signal CG at another terminal.

The terminal N1 of the capacitor is applied to a positive input of an operational amplifier 78 used as a follower amplifier (with its output looped to the negative input). The output of this amplifier delivers a voltage ramp signal Vr.

The detection circuit also has a sample-and-hold circuit 8 connected at input to the output Vr of the voltage ramp generation circuit 7 and receiving, at an input H, a sampling signal s9. The sampling signal s9 corresponds to the first binary transition of the gate control signal CG. Applied to this input H, this signal s9 enables the holding, at output V1 of the sample-and-hold circuit, of the level of voltage of the ramp at the time of this first transition. The signal s9 is, for example, given by the inverted output/Q of an RS flip-flop circuit referenced 9 in FIG. 3, receiving the gate control signal CG at its one-setting input (S) and receiving a signal RESET for the resetting of the circuit at its zero-setting input (R), activated in a standard way when the circuit is turned on.

A voltage divider circuit 10 is also designed at output Vr of the voltage ramp generation circuit to deliver a voltage ramp signal V2 whose level follows that of the signal Vr but in the ratio dictated by the divider circuit. In a standard way it has two resistive elements 101 and 102 and the signal V2 is taken at the midpoint.

Finally, a voltage comparator 11 receives the output V1 of the sample-and-hold device at a positive input and the output V2 of the resistive divider at a negative input.

The voltage comparator delivers, at output, a binary signal CF1 that is equal to 1 when the level of V2 is greater than V1 and, if not, is equal to zero. Since it is desired to distinguish the lit state of the lamp from its non-lit state, it is sought to memorize the high level of the signal CF1 at the first time that V2 becomes greater than V1: a circuit 12 to memorize the high level of the output CF1 of the voltage comparator is series-connected at the output of the comparator 11. This circuit 12 can be formed simply by means of an RS type flip-flop circuit as shown in FIG. 3. The signal CF1 is then applied to the one-setting input (S) of the flip-flop circuit. The zero-setting input (R) receives, for example, the general resetting signal RESET when the voltage is turned on. The output Q of the flip-flop circuit then delivers a binary signal CF that indicates the lit or unlit state of the lamp and is at the zero logic level so long as the level of the voltage ramp V2 is lower than the level of the voltage V1 and is at the logic level 1 as soon as the level of the voltage ramp V2 becomes greater. Regardless then of the changes in the voltage level V2, the signal CF will remain at the level 1 indicating the lit state of the lamp.

Figure 4:
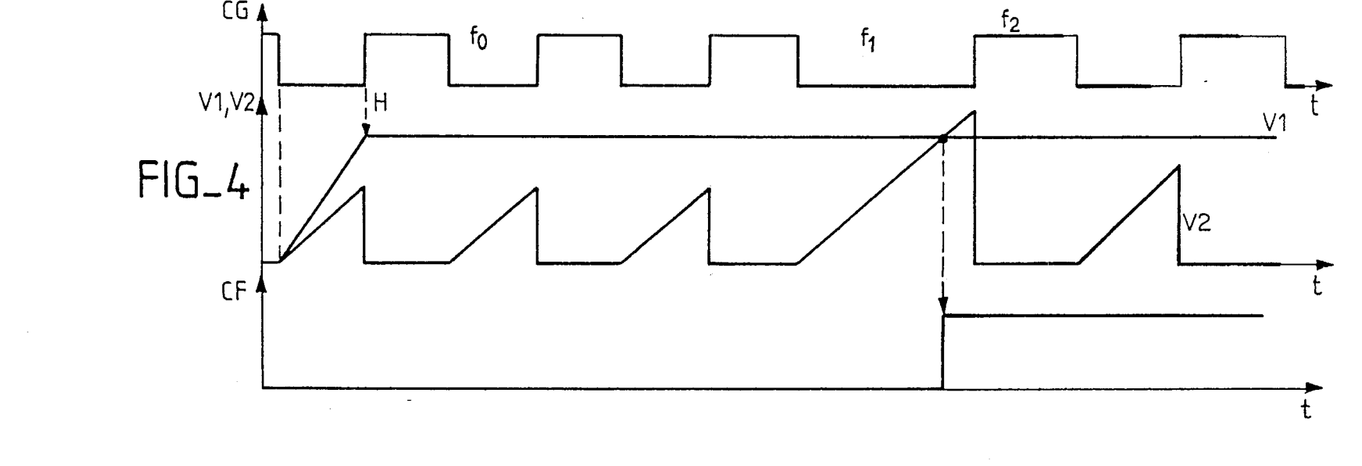
FIG. 4 is a graph of the signals corresponding to the frequency detection circuit shown in a detailed view in FIG. 3.

The principle of operation will be understood more clearly from the graphs shown in FIG. 4, representing the signals CG, V1, V2 and CF.

When the power transistor $T_a$ is off corresponding to a logic level 0 (voltage V1) of the gate control signal CG, the diodes 73, 74 are on, the transistor 72 is on and the generator GC sends a current that charges the capacitor 70. At the same time, the signal CG dictates a null voltage on the gate of the discharge transistor 76 which is therefore off. The charging of the capacitor is expressed by a voltage ramp Vr at output of the amplifier which goes from the null voltage to a voltage that increases linearly. The ramp V2 undergoes a similar progress, barring the division ratio.

When the power transistor $T_a$ becomes conductive, corresponding to a logic level 1 (voltage V1) of the gate control signal CG, the diodes 73, 74 are off and the generator GC puts out no current. By contrast, this level of the signal CG biases the gate of the discharging transistor 76 which becomes conductive and enables the very speedy discharging of the capacitor: the voltage ramp goes back to zero and remains there so long as the signal CG does not go back to zero. In this example, the signal s9 corresponds to the first detected transition from 0 to 1 given by the circuit 9. Thus, the level of the ramp at the occurrence of this first transition is held at the output V1. The ratio between the ramp Vr and the ramp V2 is chosen so that, in the resonant mode, namely for a high frequency, the ramp V2 is reset before reaching the level of the signal V1. Thus, the signal CF is always at zero indicating that the work is done in resonant mode f0 at high frequency, i.e. that the lamp is not lit.

On the contrary, it has been seen that when the lamp is lit, the resonance frequency of the unit formed by the lamp and the oscillating circuit diminishes (f1): hence, the duration of the steps of the levels 0 and 1 of the control signal CG will increase. In this case, when the level of the voltage ramp rises, the signal V2 will reach and the level of the signal V1 and go beyond this level: the comparator 11 then flips over and the signal CF1 goes to 1, indicating a lower frequency and therefore a lamp that is lit. Once this detection of a lit lamp has been done, the flip-flop circuit 12 provided for in the invention enables the holding of the corresponding information element (CF=1) at output, irrespectively of the subsequent level of V2 with respect to V1 (the resetting of the ramp at zero).

The principle of frequency detection according to the invention is especially advantageous, for a relative detection is done between the level V1 and the level V2, thus making it possible to overcome the constraints imposed by the characteristics of the different components, providing for reliable frequency detection without any adjusting circuit. This would not have been the case in an approach using an oscillator to compare the frequency of the signal CG with a fixed value.

Preferably, a ratio of 2/3 is chosen between Vr and V2 (V2=⅔Vr), which then enables an optimum relative detection of the change in frequency from f0 to f1. Then preferably, it is chosen to make the oscillating circuit work at a frequency (f2) slightly greater than the resonance frequency (f1) of the circuit when the lamp undergoes gas breakdown.

In the exemplary embodiment of FIG. 3, nothing is detected at the high level of the control signal CG. If the frequency diminishes at this level, then it will be detected only at the next 0 level.

Figure 5:
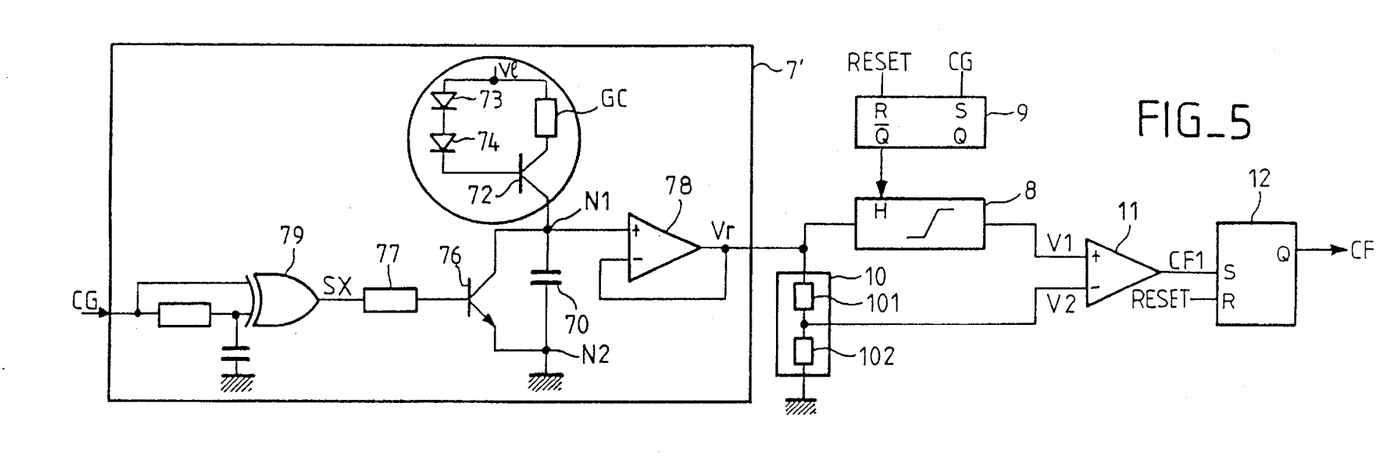
FIG. 5 is a second detailed diagram of a frequency detection circuit according to one embodiment of the invention.

A second exemplary embodiment shown in FIG. 5 enables the detection at all the levels.

The same elements bear the same references as in FIG. 3.

In fact, it is enough to modify the capacitor charging and discharging system in order, firstly, to carry out a resetting (discharging) on each transition from 0 to 1 and 1 to 0 and, secondly, to carry out a charging operation throughout the duration of the step. For the charging, this is done simply by using the same current generator CG as the one seen here above but in such a way that it is no longer blocked by the gate control signal CG: it then permanently lets through a current that charges the capacitor 70. As compared with FIG. 3, the connection is simply eliminated (with the resistor 75) from the transistor 72 and from the diodes 73 and 74 at the signal CG.

For the discharging, there is provision for an exclusive-OR gate 79 to control the gate of the discharging transistor 76. At one input, this gate 79 receives the gate control signal CG and, at another input, it receives the gate control signal delayed by a parallel RC circuit. Thus the output SX of this exclusive-OR gate delivers a pulse signal, the width of the pulse being given by the time constant of the RC circuit and a pulse being then sent out for each transition of the gate control signal CG.

Figure 6:
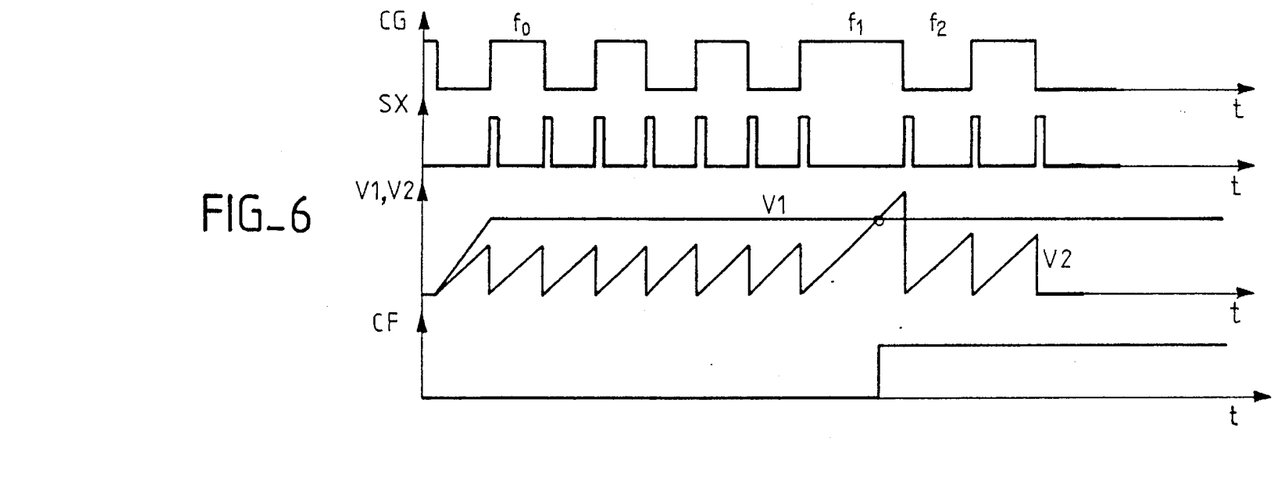
FIG. 6 is a graph of the signals corresponding to the frequency detection circuit shown in a detailed view in FIG. 5.

As shown in FIG. 6, it is also possible to detect a frequency change (f0 to f1) that occurs at a low level of the gate control signal.

According to an embodiment of the invention, the frequency detection circuit is used in relation with the two circuits 3 and 4 for detecting the end of an alternation to let through the current rerouted by the circuit 5 in a circuit for detecting the end of an alternation only, the signal CF delivered at output of the frequency detection circuit controlling the ON state or OFF state of the current input transistors of these circuits. For the unlit state of the lamp (CF=0), the current is thus let through in the circuit 3 for detecting the end of an alternation, the transistor T3 of this circuit being controlled by the signal CF and, for the lit state of the lamp (CF=1), the current is let through in the circuit 4 tbr detecting the end of the alternation. The transition T4 of this circuit is controlled by the inverted signal CF (/CF).

The invention is not limited to the embodiments described. It enables a particularly sure and low cost embodiment of the devices for the control of a low-pressure fluorescent lamp without transformers.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A control device for an oscillating circuit of a low-pressure fluorescent lamp, said control device comprising:

a frequency detection circuit, having an output, that detects whether the lamp is lit or unlit by detecting a relative drop in frequency of a current in the lamp when the lamp is lit, the frequency detection circuit providing a signal at its output indicating whether the lamp is lit or unlit;

a power transistor having first and second electrodes and a gate;

a diode having a first electrode coupled to the first electrode of the power transistor, and a second electrode coupled to the second electrode of the power transistor; and a switching control circuit having a first input coupled to the first electrode of the power transistor, a second input coupled to the second electrode of the power transistor, and an output, coupled to the gate of the power transistor, that provides a binary control signal having at least two logic states; and wherein the frequency detection circuit includes;

a voltage ramp generation circuit having an input, coupled to the gate of the power transistor, that receives the binary control signal, and an output that provides a ramp signal having a ramp voltage, the ramp voltage being reset to zero when a transition of the logic state of the binary control signal occurs;

a sample-and-hold circuit having an input coupled to the output of the voltage ramp generation circuit, the sample-and-hold circuit storing the ramp voltage when a first transition of the logic state of the binary control signal occurs, the sample-and-hold circuit having an output that provides the stored ramp voltage;

a voltage divider circuit having a voltage ratio, an input coupled to the output of the ramp generation circuit, and an output that provides a divided voltage signal having a voltage equal to the ramp voltage divided by the voltage ratio;

a voltage comparator having a first input, coupled to the output of the sample and hold circuit, that receives the stored ramp voltage, a second input, coupled to the output of the voltage divider circuit, that receives the divided voltage signal, and an output that provides a comparison signal having a first logic level when the stored ramp voltage is greater than the divided voltage signal and a second logic level when the stored ramp voltage is less than the divided voltage signal, and a storage circuit that stores the logic level of the output of the voltage comparator, the storage circuit having an input coupled to the output of the voltage comparator, and an output that provides a signal having a first value indicating that the lamp is lit and a second value indicating that the lamp is unlit.

2. The control device according to claim 1, wherein the oscillating circuit and the lamp have a first resonant frequency when the lamp is lit and a second resonant frequency when the lamp is unlit, the control device further comprising:

a first circuit to lock the frequency of the current in the lamp to the first resonant frequency of the oscillating circuit and the lamp when the lamp is unlit: and a second circuit to lock the frequency of the current in the lamp to a frequency greater than the second resonant frequency of the oscillating circuit and the lamp when the lamp is lit.

3. The control device according to claim 2, wherein:

the first circuit has a first input coupled to the output of the frequency detection circuit to receive the binary signal, the first circuit being activated when the binary signal is in the second logic state and being deactivated when the binary signal is in the first logic state; and the second circuit has a first input coupled to the output of the frequency detection circuit to receive the binary signal, the second circuit being activated when the binary signal is in the first logic state and being deactivated when the binary signal is in the second logic state.

4. The control device according to claim 3, wherein the at least two logic states of the binary control signal include a first state and a second state, and wherein the voltage of the voltage ramp generation circuit is set to zero at each transition from the first state to the second state and from the second state to the first state of the binary control signal.

5. The control device according to claim 3, wherein the at least two logic states of the binary control signal include a first state and a second state, and wherein the voltage of the voltage ramp generation circuit is set to zero at each transition from the first state to the second state of the binary control signal.

6. The control device according to claim 2, wherein the at least two logic states of the binary control signal include a first state and a second state, and wherein the voltage of the voltage ramp generation circuit is set to zero at each transition from the first state to the second state and from the second state to the first state of the binary control signal.

7. The control device according to claim 2, wherein the at least two logic states of the binary control signal include a first state and a second state, and wherein the voltage of the voltage ramp generation circuit is set to zero at each transition from the first state to the second state of the binary control signal.

8. The control device according to claim 1, wherein the at least two logic states of the binary control signal include a first state and a second state, and wherein the voltage of the voltage ramp generation circuit is set to zero at each transition from the first state to the second state of the binary control signal.

9. The control device according to claim 1, wherein the at least two logic states of the binary control signal include a first state and a second state, and wherein the voltage of the voltage ramp generation circuit is set to zero at each transition from the first state to the second state and from the second state to the first state of the binary control signal.

10. The control device according to claim 9, wherein the voltage ratio of the voltage divider is equal to 3:2.

11. The control device according to claim 1, wherein the voltage ratio of the voltage divider is equal to 3:2.

12. The control device of claim 1, wherein the switching control circuit further includes a third input coupled to the output of the frequency detection circuit.

13. A control device for an oscillating circuit of a low-pressure fluorescent lamp, said control device comprising:

a frequency detection circuit, having an output, that detects whether the lamp is lit or unlit by detecting a frequency of a current in the lamp, the frequency detection circuit providing a signal at its output indicating whether the lamp is lit or unlit:

a power transistor having first and second electrodes and a gate;

a diode having a first electrode coupled to the first electrode of the power transistor, and a second electrode coupled to the second electrode of the power transistor; and a switching control circuit having a first input coupled to the first electrode of the power transistor, a second input coupled to the second electrode of the power transistor, and an output, coupled to the gate of the power transistor, that provides a binary, control signal having at least two logic states; and wherein the frequency detection circuit includes;

a voltage ramp generation circuit having an input, coupled to the gate of the power transistor, that receives the binary control signal, and an output that provides a ramp signal having a ramp voltage, the ramp voltage being reset to zero when a transition of the logic state of the binary control signal occurs:

a sample-and-hold circuit having an input coupled to the output of the voltage ramp generation circuit, the sample-and-hold circuit storing the ramp voltage when a first transition of the logic state of the binary control signal occurs, the sample-and-hold circuit having an output that provides the stored ramp voltage;

a voltage divider circuit having a voltage ratio, an input coupled to the output of the ramp generation circuit, and an output that provides a divided voltage signal having a voltage equal to the ramp voltage divided by the voltage ratio;

a voltage comparator having a first input, coupled to the output of the sample and hold circuit, that receives the stored ramp voltage, a second input, coupled to the output of the voltage divider circuit, that receives the divided voltage signal, and an output that provides a comparison signal having a first logic level when the stored ramp voltage is greater than the divided voltage signal and a second logic level when the stored ramp voltage is less than the divided voltage signal, and a storage circuit that stores the logic level of the output of the voltage comparator, the storage circuit having an input coupled to the output of the voltage comparator, and an output that provides a signal having a first value indicating that the lamp is lit and a second value indicating that the lamp is unlit.

14. The control device according to claim 13, wherein the oscillating circuit and the lamp have a first resonant frequency when the lamp is lit and a second resonant frequency when the lamp is unlit, the control device further comprising:

a first circuit to lock the frequency of the current in the lamp to the first resonant frequency of the oscillating circuit and the lamp when the lamp is unlit; and a second circuit to lock the frequency of the current in the lamp to a frequency greater than the second resonant frequency of the oscillating circuit and the lamp when the lamp is lit.

15. The control device according to claim 14, wherein:

the first circuit has a first input coupled to the output of the frequency detection circuit to receive the binary signal, the first circuit being activated when the binary signal is in the second logic state and being deactivated when the binary signal is in the first logic state; and the second circuit has a first input coupled to the output of the frequency detection circuit to receive the binary signal, the second circuit being activated when the binary signal is in the first logic state and being deactivated when the binary signal is in the second logic state.

16. The control device according to claim 15, wherein the logic state of the binary control signal transitions between levels of zero and one, and wherein the voltage of the voltage ramp generation circuit is set to zero at each transition from zero to one of the logic state of the binary control signal.

17. The control device according to claim 15, wherein the logic state of the binary control signal transitions between levels of zero and one, and wherein the voltage of the voltage ramp generation circuit is set to zero at each transition from zero to one and from one to zero of the logic state of the binary control signal.

18. The control device according to claim 15, wherein the voltage ratio of the voltage divider is equal to 3:2.

19. The control device of claim 13, wherein the switching control circuit further includes a third input coupled to the output of the frequency detection circuit.

20. A control device for an oscillating circuit having a first resonant frequency in a first mode of operation and a second resonant frequency in a second mode of operation, the control device comprising:

a frequency detection circuit that detects a frequency of operation of the oscillating circuit;

an indication circuit, coupled to the frequency detection circuit, that provides a signal indicating whether the oscillating circuit is operating in the first or the second mode of operation based upon its frequency of operation;

a switching control circuit that alters the frequency of operation from the second resonant frequency when the oscillating circuit is operating in the second mode of operation;

a transistor having first and second electrodes and a gate, the transistor having an on state and an off state, at least one electrode of the transistor being connectable to the oscillating circuit to receive current through the oscillating circuit when the transistor is in the on state; and a diode having a first electrode coupled to the first electrode of the transistor, and a second electrode coupled to the second electrode of the transistor;

wherein the switching control circuit has a first input coupled to the first electrode of the transistor, a second input coupled to the second electrode of the transistor, a third input coupled to the indication circuit to receive the signal indicating whether the lamp is lit or unlit, and an output, coupled to the gate of the transistor, that provides a control signal having a first value that activates the on state of the transistor and a second value that activates the off state of the transistor;

and wherein the frequency detection circuit further includes an input, coupled to the gate of the transistor, that receives the control signal, the frequency detection circuit detecting a drop in the frequency of the oscillating circuit based on changes in value of the control signal.

21. The control device of claim 20, wherein the frequency control circuit increases the frequency of operation of the oscillating circuit to a frequency greater than the second resonant frequency when the fluorescent lamp is lit.

22. The control device according to claim 20, wherein the switching control circuit includes:

a first circuit to lock the frequency of operation of the oscillating circuit to the first resonant frequency when the oscillating circuit is operating in the first mode; and a second circuit to lock the frequency of operation of the oscillating circuit to a frequency greater than the second resonant frequency when the oscillating circuit is operating in the second mode of operation.

23. The control device according to claim 22, wherein:

the first circuit has a first input coupled to the output of the frequency detection circuit to receive the control signal, the first circuit being activated when the control signal has the second value and being deactivated when the control signal has the first value: and the second circuit has a first input coupled to the output of the frequency detection circuit to receive the control signal, the second circuit being activated when the control signal has the first value and being deactivated when the control signal has the second value.

24. A fluorescent lamp apparatus comprising:

a fluorescent lamp having first and second inputs;

an inductor having a first terminal coupled to the first input of the fluorescent lamp, and a second terminal;

a capacitor having a first terminal coupled to the first input of the fluorescent lamp, and a second terminal coupled to the second input of the fluorescent lamp, wherein the fluorescent lamp, the inductor, and the capacitor form an oscillating circuit having a first resonant frequency when the fluorescent lamp is lit and a second resonant frequency when the fluorescent lamp is unlit; and a control circuit having a first input coupled to the second terminal of the inductor, and a second input coupled to the second input of the fluorescent lamp, the control circuit including:

a frequency detection circuit that detects a frequency of operation of the oscillating circuit;

an indication circuit, coupled to the frequency detection circuit, that provides a signal indicating whether the fluorescent lamp is lit or unlit based upon the frequency of operation of the oscillating circuit:

a switching control circuit that alters the frequency of operation of the oscillating circuit from the second resonant frequency when the fluorescent lamp is lit;

a transistor having first and second electrodes and a gate, the transistor having an on state and an off state, the first and second electrodes of the transistor respectively being coupled to the first and second inputs of the control circuit such that a current of the oscillating circuit flows through the transistor when the transistor is in the on state; and a diode having a first electrode coupled to the first electrode of the transistor, and a second electrode coupled to the second electrode of the transistor;

wherein the switching control circuit has a first input coupled to the first electrode of the transistor, a second input coupled to the second electrode of the transistor, a third input coupled to the indication circuit to receive the signal indicating whether the lamp is lit or unlit, and an output, coupled to the gate of the transistor, that provides a control signal having a first value that activates the on state of the transistor and a second value that activates the off state of the transistor: and wherein the frequency detection circuit further includes an input, coupled to the gate of the transistor, that receives the control signal, the frequency detection circuit detecting a drop in the frequency of the oscillating circuit based on changes in value of the control signal.

25. The fluorescent lamp apparatus of claim 24, wherein the switching control circuit further includes:

a first circuit that locks the frequency of operation of the oscillating circuit to the first resonant frequency when the fluorescent lamp is unlit; and a second circuit that locks the frequency of operation of the oscillating circuit to a frequency other than the second resonant frequency when the lamp is lit.

26. The fluorescent lamp apparatus of claim 25, wherein the second circuit locks the frequency of operation of the oscillating circuit to a frequency greater than the second resonant frequency when the lamp is lit.

27. The fluorescent lamp apparatus of claim 25, wherein:

the first circuit has a first input coupled to the output of the frequency detection circuit to receive the control signal, the first circuit being activated when the control signal has the second value and being deactivated when the control signal has the first value; and the second circuit has a first input coupled to the output of the frequency detection circuit to receive the control signal, the second circuit being activated when the control signal has the first value and being deactivated when the control signal has the second value.

28. A control device for controlling an oscillating circuit having a frequency of operation, the control device comprising:

a transistor having first and second electrodes and a gate, the transistor having an on state and an off state, at least one of the first and second electrodes of the transistor being connectable to the oscillating circuit to receive a current from the oscillating circuit when the transistor is in the on state;

a switching control circuit that controls the frequency of operation of the oscillating circuit, the switching control circuit having an input coupled to the oscillating circuit to detect the current from the oscillating circuit, and having an output coupled to the gate of the transistor to provide a control signal having a first value that activates the on state of the transistor and a second value that activates the off state of the transistor;

a detection circuit that detects a characteristic of the control signal to determine the frequency of operation of the oscillating circuit, the detection circuit having an input coupled to the gate of the transistor to receive the control signal and having an output that provides an indication signal having a value indicative of the frequency of operation of the oscillating circuit.

29. The control device of claim 28, wherein the control signal has a frequency related to the frequency of operation of the oscillating circuit, and wherein the detection circuit is a frequency detection circuit that detects the frequency of the control signal.

* * * * *